(12) United States Patent
Harding et al.

(10) Patent No.: US 7,146,392 B2
(45) Date of Patent: Dec. 5, 2006

(54) RANDOM NUMBER GENERATOR

(75) Inventors: Riyon W. Harding, Richmond, VT (US); Karl V. Swanke, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 10/604,178

(22) Filed: Jun. 30, 2003

(65) Prior Publication Data
US 2004/0267844 A1 Dec. 30, 2004

(51) Int. Cl.
*G06F 1/02* (2006.01)

(52) U.S. Cl. ........................ 708/250; 708/254

(58) Field of Classification Search .............. 708/250, 708/253, 254, 255, 256
See application file for complete search history.

(56) References Cited

U.S. PATENT DOCUMENTS

| 6,253,223 | B1 * | 6/2001 | Sprunk | ............... 708/250 |
|---|---|---|---|---|
| 6,493,859 | B1 | 12/2002 | Gould et al. | |
| 6,542,014 | B1 | 4/2003 | Saito | |
| 6,625,767 | B1 * | 9/2003 | Ayrignac | ............... 714/724 |
| 6,795,837 | B1 * | 9/2004 | Wells | ............... 708/3 |
| 2004/0019617 | A1 * | 1/2004 | Hars | ............... 708/250 |

* cited by examiner

*Primary Examiner*—Chuong D. Ngo
(74) *Attorney, Agent, or Firm*—Downs Rachlin Martin PLLC

(57) ABSTRACT

A random number generator (10) comprising a plurality of voltage islands (12) on a chip (14), one or more latches (16) located on each of plurality of voltage islands (12), with one or more latches (16) adapted to capture the voltage value of the respective voltage island on which they are located as an input value of one or more latches (16), a control circuit (18) for randomly controlling the state of each of plurality of voltage islands (12) and for capturing an output value for each of one or more latches (16), and a conversion circuit (20) for producing decimal numbers from the output value for each of one or more latches (16). In one embodiment, control circuit (18) includes two or more clocks (30), a multiplexer (32) for each of plurality of voltage islands (12), and an enable circuit (34) for each of plurality of voltage islands (12).

20 Claims, 7 Drawing Sheets

RANDOM NUMBER GENERATOR

BACKGROUND OF INVENTION

1. Field of the Invention

The present invention relates to a random number generator, and in particular to a random number generator for generating random numbers that are utilized as seeds by a random number generator to generate random numbers having a greater degree of randomness.

2. Background of the Invention

Random number generation and random number generators are typically used to generate random numbers for simulations in computational science and engineering. Random numbers are used to model the randomness of random noise or perturbations and quantum processes. Random number generators are also used in many other applications including slot machines and cryptography.

Because random number generators typically generate random numbers using deterministic algorithms, random number generators are often called pseudo-random number generators. In many applications, the quality of the overall randomness (i.e., how closely the random numbers resemble truly random sequences) of the numbers generated is not particularly important. However, in many of the areas where random number generation is heavily used, e.g., security applications and sophisticated scientific modeling applications, the quality or overall randomness of the random numbers generated is very important.

Typical random number generators rely on one or more seeds to generate random numbers. The seeds are fed to the random number generator. The random number generator processes the seeds through a series of algorithms to generate a random number. Typically, use of the same seed number or same combination of seeds will generate the same random number. As a result, the overall randomness of the seed number may be critical in determining the overall quality of the random numbers generated by a particular random number generator.

Prior art systems for enhancing the overall quality of the one or more seeds include schemes that involve measuring the random phenomenon of nuclear decay and the light of a light-emitting diode. Other known systems involve measuring the time between randomly generated analog pulse signals. Although prior art systems may provide one or more high quality seeds, prior art systems often require complex manufacturing processes, higher manufacturing costs, and are difficult to contain within a compact space such as a chip. In addition, many prior art schemes include digital signals that may be compromised by outside sources.

SUMMARY OF INVENTION

One aspect of the present invention is a random number generator including a plurality of voltage islands, one or more latches located on each of the ality of voltage islands, the one or more latches adapted to capture the voltage value of the respective voltage island on which they are located as an input value of the one or more latches, and a control circuit for randomly controlling the state of each of the plurality of voltage islands and for capturing an output value for each of the one or more latches.

Another aspect of the present invention is a system for generating random numbers including a voltage island module having a plurality of voltage islands, one or more latches located on each of the plurality of voltage islands, the one or more latches adapted to capture the voltage value of the respective voltage island on which they are located, a control module adapted to randomly control the state of each of the plurality of voltage islands and capture an output value for each of the one or more latches, a conversion module adapted to produce one or more binary numbers from the output value for each of the one or more latches, and a random number generator module adapted to receive each of the one or more binary numbers as one or more seed numbers and generate random numbers.

Still another aspect of the present invention is a method of generating random numbers including the following steps: providing a plurality of voltage islands, each of the plurality of voltage islands having one or more latches; randomly controlling the state of each of the plurality of voltage islands; capturing the voltage value of each of the plurality of voltage islands via the one or more latches; capturing an output value for each of the one or more latches; and converting the output value for each of the one or more latches to one or more binary numbers.

Other features, utilities and advantages of various embodiments of the invention will be apparent from the following more particular description of embodiments of the invention as illustrated in the accompanying drawings.

BRIEF DESCRIPTION OF DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

The present invention is a random number generator for generating random seeds to be used by conventional random number generators in generating higher quality random numbers. In the present invention, random seeds having a high degree of randomness are generated by capturing the latch values corresponding to voltage values of voltage islands during their ramp-up or ramp-down in voltage. The seeds are then fed to a conventional random number generator that utilizes algorithms to generate random numbers. Because of the high degree of randomness of the latch values, the seeds have a higher degree of randomness, and ultimately the random numbers produced by the conventional random number generator have a higher degree of randomness. The following provides a detailed description of drawings illustrating various embodiments of the present invention. Like elements include like element numbers. In addition, because the present invention involves a plurality of identical element groups, the drawings illustrate a representative sampling of the groups as indicted by their numbering from 1 to n. In that way, only element group 1, e.g., containing CLOCK 1, MULTIPLEXER 1, and EN 1 in FIG. 2 and other FIGS., includes element numbers. The remaining groups, i.e., 2 through n, are configured identically to group 1.

Figure 1:
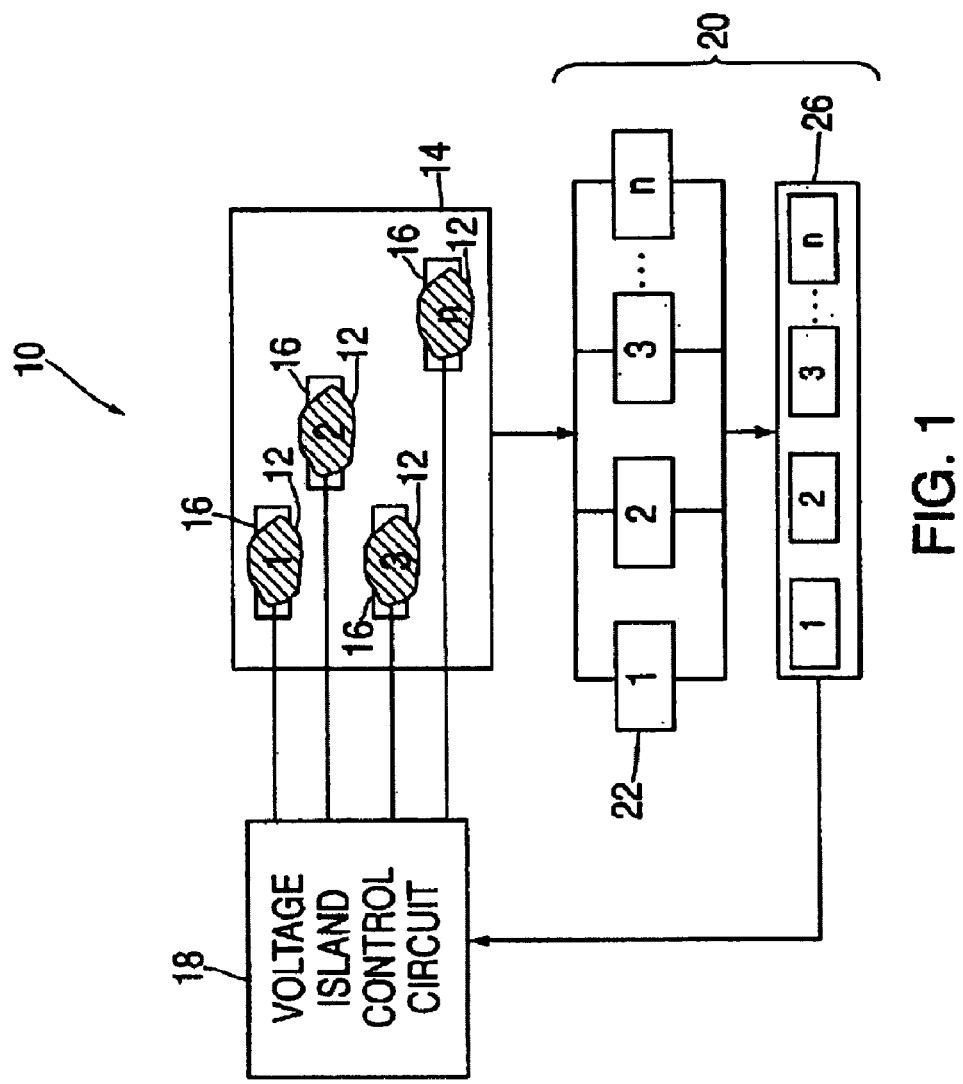
FIG. 1 is a block diagram of a system for generating random numbers according to one embodiment of the present invention.

FIG. 1 illustrates one embodiment of a random number generator 10 used to produce random seeds for conventional random number generators. Each of a plurality of voltage islands 12 on a chip 14 has one or more latches 16. A voltage island control circuit 18 is joined with each of voltage islands 12 and each of latches 16. A conversion circuit 20 receives the output of each of latches 16. In the embodiment illustrated in FIG. 1, conversion circuit 20 includes a first register 22 and a second register 26. Of course, as one skilled in the art will appreciate, there are myriad schemes that may be used to convert the output of each latch 16 from binary number strings to decimal number strings. As indicated in FIG. 1 and below, each of voltage islands 12 will typically be configured identically.

Voltage islands 12 have a predetermined maximum voltage value that may differ for each of the voltage islands. Since voltage islands 12 cannot reach their predetermined maximum voltage instantaneously upon power-up, there is a period where the voltage ramps up to the predetermined maximum value. Likewise, at power-off, there is a given period of time in which the voltage ramps down. Therefore, the true voltage value of each of voltage islands 12 is randomly varied between 0V and the predetermined maximum voltage. Voltage island control circuit 18 randomly controls both the state of each of voltage islands 12, i.e., whether they are on and ramping-up voltage or whether they are off and ramping-down voltage, and randomly captures the latch output value of each of latches 16. Latches 16 have latch output values (not shown) that are binary numbers, i.e., 0 or 1, which are generated according to the voltage value of the respective voltage island 12. For example, in the embodiments described herein, if a voltage value is very low with respect to the maximum voltage value of the voltage island, the latch output value will likely be a binary 0 and if the voltage value is very high with respect to the maximum voltage value of the voltage island, the latch output value will likely be a binary 1. However, the random nature of the voltage island values at the latch inputs causes the latches to become metastable. Thus, a lower voltage value at the voltage island may generate a latch output value having a binary 1 and in other instances, a higher voltage value at the voltage island may generate a latch output value having a binary 0.

As part of conversion circuit 20, the latch output values (binary 0 or 1) for each of latches 16 at each of voltage islands 12 are output to first register 22 to form a binary number string. For each of voltage islands 12, each binary number string is converted to a decimal number string at first register 22. The decimal number is then stored in second register 26. Second register 26 combines and stores all the decimal numbers for each of voltage islands 12. As discussed further below with respect to FIGS. 5 and 6, the decimal number string stored in second register 26 is a randomly generated number that may be utilized as a seed number for a conventional random number generator.

Figure 2:
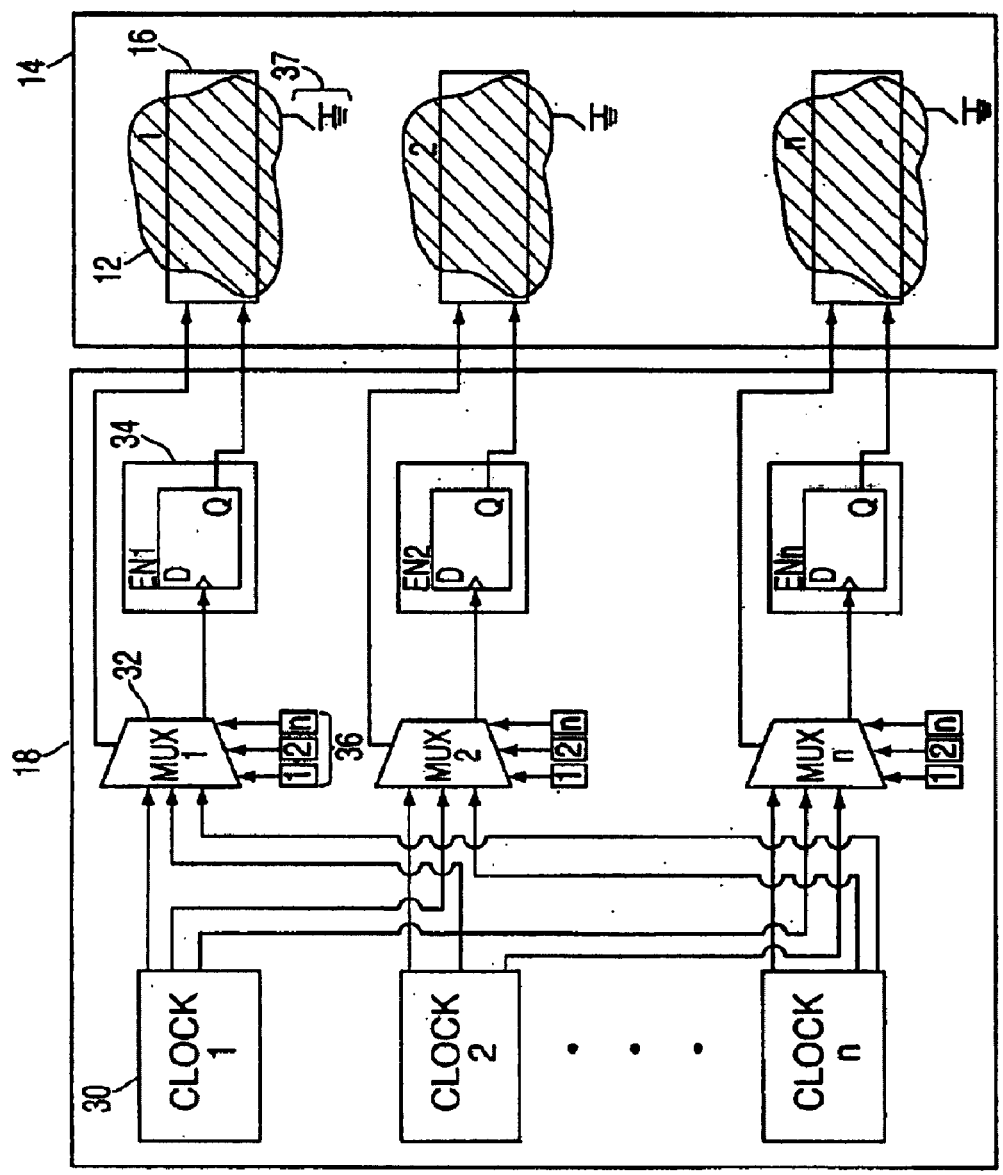
FIG. 2 is a circuit diagram of a voltage island control circuit according to one embodiment of the present invention.

In FIG. 2, the internal components that make up voltage island control circuit 18 are illustrated. Two or more asynchronous clocks 30 are each connected to a plurality of multiplexers 32. Each multiplexer 32 is connected to both a particular voltage island 12 via a corresponding enable circuit 34 and via a corresponding latch 16 at the particular voltage island. Each multiplexer 32 receives a plurality of clock select signals via lines 36. In the embodiment illustrated in FIG. 2, each of voltage islands 12 includes a ground switch 37 for discharging each voltage island.

In control circuit 18, two or more asynchronous clocks 30 each send a clock signal, i.e., a binary 0 or 1, (not shown) to a plurality of multiplexers 32. Each of multiplexer 32 selects a single clock signal according to which clock select signal is sent to each multiplexer through clock select signal line 36. Typically, each of multiplexers 32 selects a single clock signal based on one of the seeds. For example, in one embodiment, if a seed number is 42136, the last digit, i.e., 6, may be used to cause each of multiplexers 32 to select the signal from clock number 6. Each of multiplexers 32 forwards the selected clock signal to each of enable circuit 34 and each of latches 16.

Figure 3:
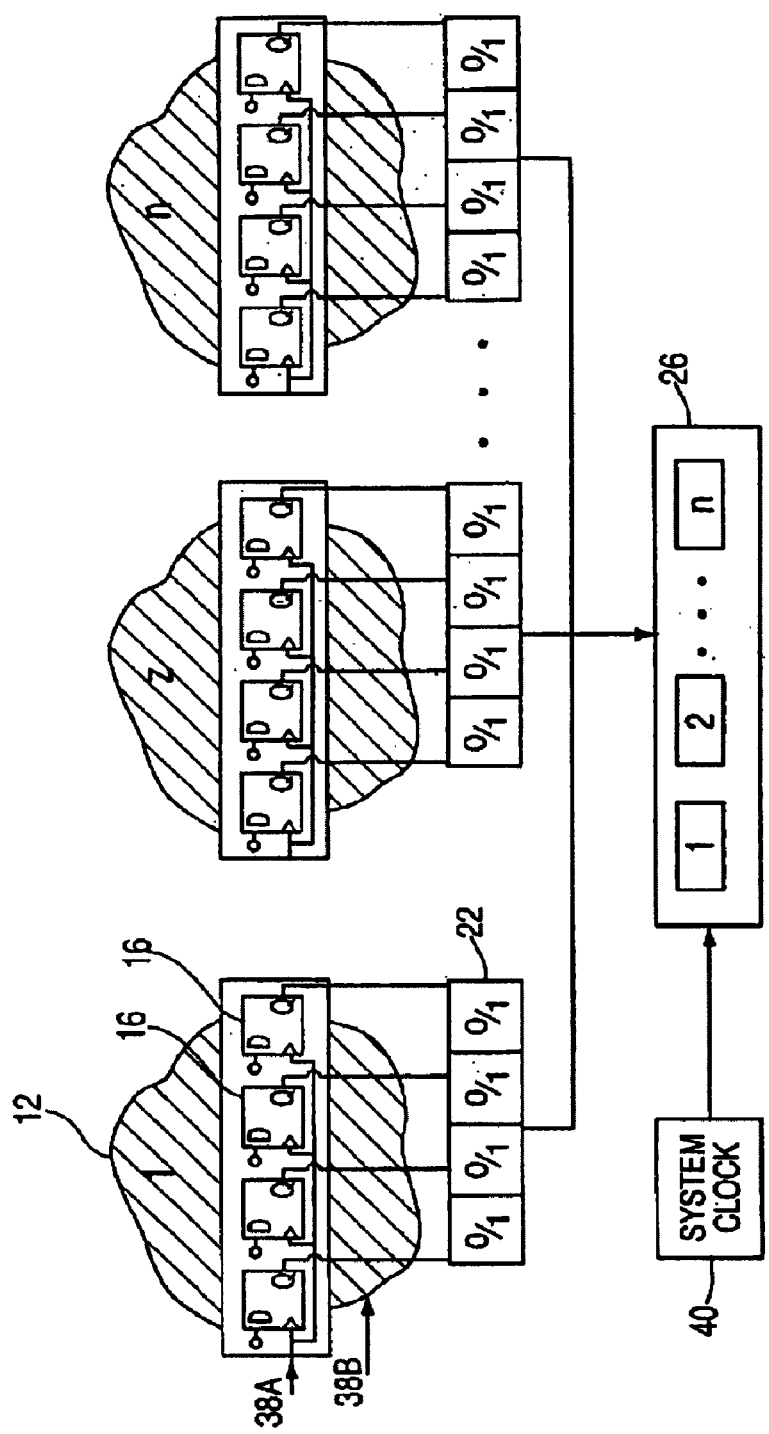
FIG. 3 is a block diagram of a conversion circuit according to one embodiment of the present invention.
Figure 4:
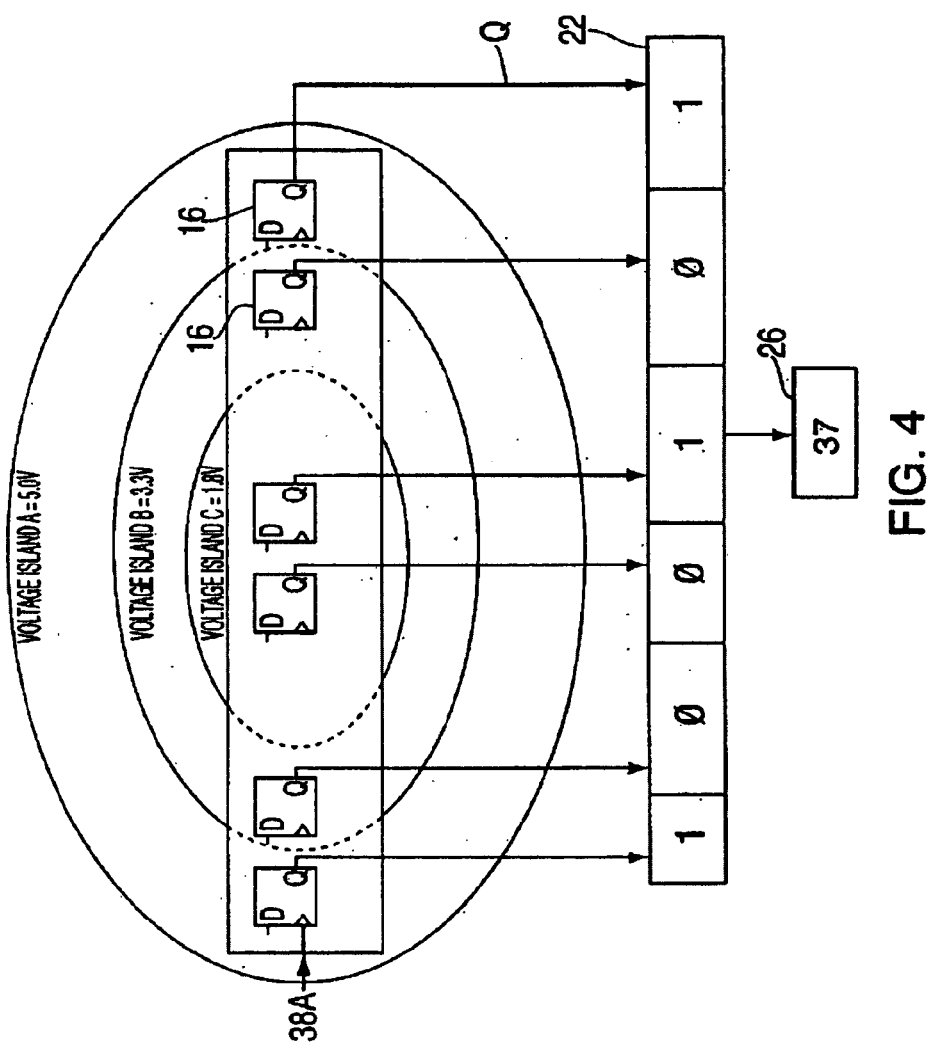
FIG. 4 is an enlarged block diagram of overlapping voltage islands and a conversion circuit according to one embodiment of the present invention.

Referring now to FIGS. 3 and 4, as mentioned above, a plurality of voltage islands 12, i.e., 1 through n, may be present. Each of voltage islands 12 may include one or more latches 16. Each of latches 16 receives selected clock signal 38A from multiplexer 32 (see FIG. 2). Voltage island 12 receives clock signal 38B from multiplexer 32 (see FIG. 2). As mentioned above, input D of each of latches 16 is electrically connected to the voltage island from voltage islands 12. The output Q is a binary 0 or 1 based on the latch input D. However, since the voltage value of each of voltage islands 12 is random, due to turning voltage islands 12 on and off at random intervals, the output Q is thereby also random. Output Q, i.e., a binary 0 or binary 1, from each of latches 16 are sent to register 22 to form a binary number string. At register 22, the binary number string is concatenated to a larger binary string. The larger binary string is sent to register 26 at clocked intervals according to system clock 40. Register 26 combines each larger binary string to form a single binary seed. As explained above, either the entire binary seed formed in register 26 or a portion thereof is a random binary seed that can be used as a random seed in a conventional random number generator.

As illustrated in FIG. 4, in some embodiments, various voltage islands from voltage islands 12 may overlap thereby allowing individual latches to reside on voltage islands with varying maximum voltages. In FIG. 4, three voltage islands, A, B, and C, have three different voltage values, 5.0 V, 3.3 V, and 1.8 V, respectively. By way of example, in this embodiment, register 22 has six latch output values forming the binary number string 100101. Accordingly, register 26 includes the corresponding binary string 100101.

Figure 5:
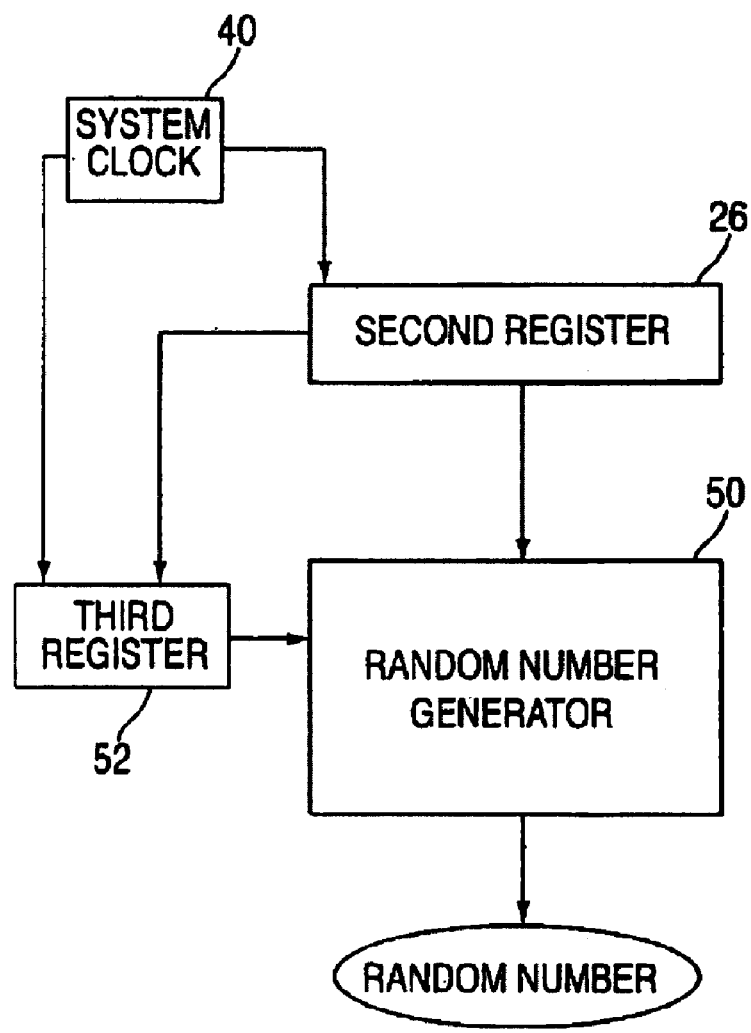
FIG. 5 is a block diagram of a system for generating random numbers including a conventional random number generator, according to one embodiment of the present invention.
Figure 6:
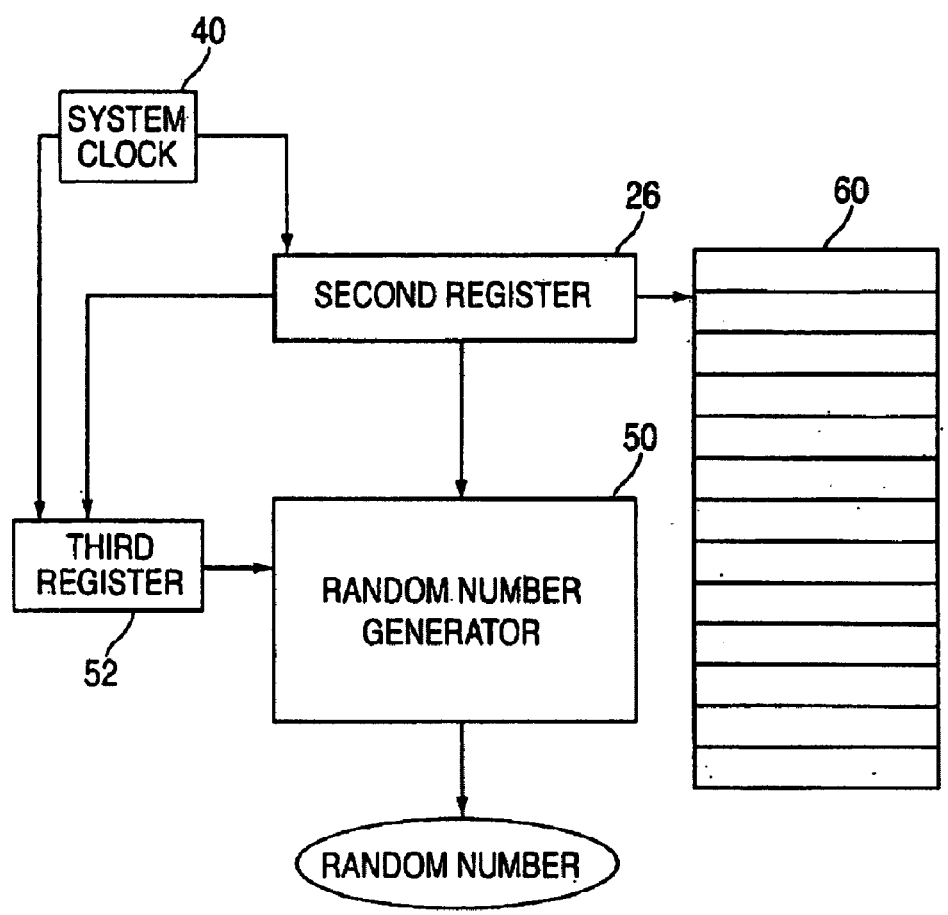
FIG. 6 is a block diagram of a system for generating random numbers including a conventional random number generator and a register for storing random seeds, according to one embodiment of the present invention.

Referring now to FIGS. 5 and 6, in another embodiment of the present invention, a system for generating higher quality random numbers includes the random number generator described above and a conventional random number generator 50. The random numbers generated in the novel system described above and stored in second register 26, are used as seeds for conventional random number generator 50. Because, conventional random number generators typically require two seeds to produce a random number, a storage register or third register 52, is also included in the embodiment illustrated in FIG. 5.

In each cycle of use, a first random seed is generated and stored in second register 26. Next, the first random seed is moved to third register 52 and a second random seed is generated and stored in second register 26. Upon receipt of a send signal from system clock 40, both second register 26 and third register 52 send first and second random seeds, respectively, to conventional random number generator 50. Conventional random number generator 50 uses the random seeds to generate a random number.

In FIG. 6, the system in FIG. 5 includes another storage register, a fourth register 60, which is used to store the random seeds in memory for later use. Fourth register 60 may be a buffer such as a FIFO or any type of memory table that one skilled in the art would appreciate. The random seeds stored in fourth register 60 may be used as seeds to conventional random number generator 50 at a later time or sent to each multiplexer 32 (see FIG. 2) as a clock select signal through clock select signal line 36. Additionally, each multiplexer 32 may receive a unique seed number from forth register 60 as a clock select signal line 36 such that at any given time each multiplexer 32 receives a unique clock select line signal from the list of seeds. Furthermore, seeds stored in register 60 may be used at a later time for testing purposes to ensure the randomness of random number generator 50.

Figure 7:
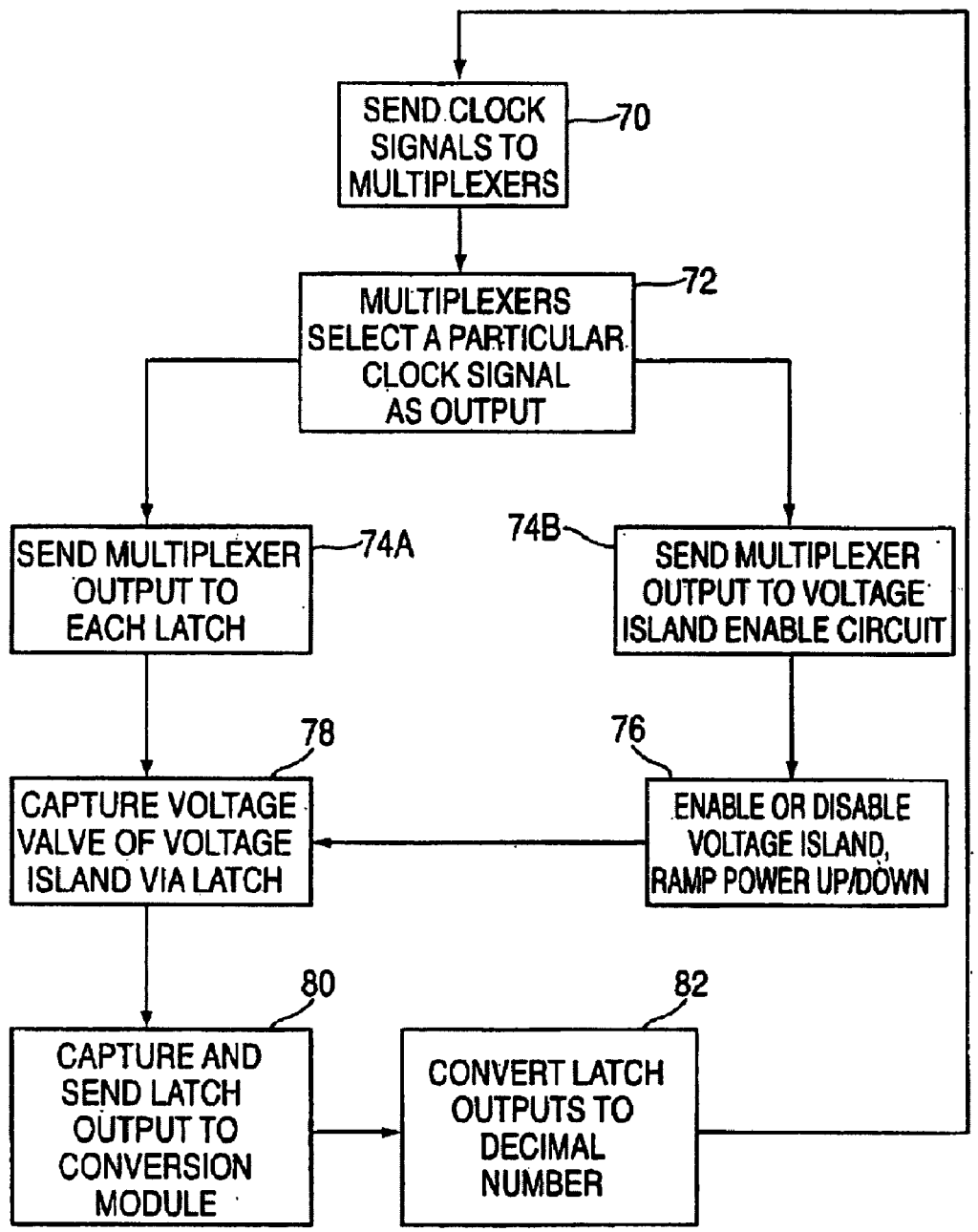
FIG. 7 is a flowchart that includes the steps of a method of generating random numbers according to one embodiment of the present invention.

Referring now to FIGS. 7, 1, and 2, the present invention also includes a method for generating random numbers to be used as random seeds in a conventional random number generator. During initialization of the method, system clock 40 enables all voltage islands 12 and each of latches 16 to create a first seed number. Alternatively, control software may take a user-specified first random seed to store in third register 52 as the first seed and the value for clock select lines 36. Once the first seed number is created, the random number generating system continues as follows. First, at step 70, each of asynchronous clocks 30 sends a clock signal, i.e., a binary 0 or 1 to each of multiplexers 32. Next, at step 72, upon receipt of a clock select signal through one of a plurality of clock select signal lines 36, each of multiplexer 32 selects a clock signal to forward. The selected clock signal is simultaneously forwarded by multiplexer 32 to each of latches 16 at each of voltage islands 12 at step 74A and to each voltage island enable circuit 34 at step 74B. Then, at step 76, each of voltage islands 12 is enabled or disabled causing its power to ramp-up or ramp-down. At the same time that each of voltage islands 12 is enabled or disabled, the latch output value (based on the voltage value of each of voltage islands 12) at each of latches 16 is captured at step 78. Next, at steps 80 and 82, the latch output values, i.e., a plurality of binary 0s or 1s, are sent to conversion circuit 20, where they are concatenated to a binary string. The binary string created may be utilized as a random seed for use in a conventional random number generator and/or may be utilized in the random number generation system described above as clock select signal line 36. The cycle for generating random numbers may also include draining the voltage from each of voltage islands 12 via ground switch 37.

The generator, system, and method of the present invention provide an efficient way of creating higher quality random numbers within a chip environment. In addition, because the seeds are not created via digital processing, predicting the outcome or breaking the code of the random number generator cannot be preformed with conventional methods. Thus, the system for generating random numbers is secure from outside intrusion.

While the present invention has been described in connection with specified embodiments, it will be understood that it is not so limited. On the contrary, it is intended to cover all alternatives, modifications and equivalents as may be included within the spirit and scope of the invention as defined in the appended claims.

The invention claimed is:

1. A random number generator comprising:
a plurality of voltage islands;
one or more latches located on each of said plurality of voltage islands, said one or more latches adapted to capture the voltage value of the respective voltage island on which they are located as an input value of said one or more latches; and
a control circuit for randomly controlling the state of each of said plurality of voltage islands and for capturing an output value for each of said one or more latches.

2. A random number generator according to claim 1, wherein said control circuit includes two or more clocks, each of said clocks having a logic value, a multiplexer for each of said plurality of voltage islands, each of said multiplexers adapted to receive each of said logic values, and an enable circuit for each of said plurality of voltage islands.

3. A random number generator according to claim 2, wherein each of said two or more clocks is adapted to send said logic values to each of said multiplexers, each of said multiplexers is adapted to select a clock logic value and send said clock logic value to each of said voltage islands via said enable circuits, and said voltage islands is turned on or off depending on said clock logic value.

4. A random number generator according to claim 2, wherein each of said two or more clocks is adapted to send said clock logic value to each of said multiplexers, each of said multiplexers is adapted to select a particular clock logic value and send said particular clock logic value to each of said one or more latches at said voltage islands.

5. A random number generator according to claim 4, wherein each of said one or more latches is adapted to take a voltage value reading of their respective voltage island and send a corresponding output value to a register when said clock logic value is received by each of said one or more latches.

6. A random number generator according to claim 1, further comprising a conversion circuit for producing one or more binary numbers from said output value for each of said one or more latches, wherein said conversion circuit includes one or more registers for collecting latch output values and converting collected values to binary number strings.

7. A random number generator according to claim 6, wherein said conversion circuit includes a register for storing binary numbers for later use by the random number generator.

8. A system for generating random numbers comprising:
a voltage island module having a plurality of voltage islands, one or more latches located on each of said plurality of voltage islands, said one or more latches adapted to capture the voltage value of the respective voltage island on which they are located;
a control module adapted to randomly control the state of each of said plurality of voltage islands and capture an output value for each of said one or more latches;
a conversion module adapted to produce one or more binary numbers from said output value for each of said one or more latches; and a random number generator module adapted to receive each of said one or more binary numbers as one or more seed numbers and generate random numbers.

9. A system for generating random numbers according to claim 8, wherein said control module includes two or more clocks, each of said clocks having a logic value, a multiplexer for each of said plurality of voltage islands, each of said multiplexers adapted to receive each of said logic values, and an enable circuit for each of said plurality of voltage islands.

10. A system for generating random numbers according to claim 9, wherein each of said two or more clocks is adapted to send said logic values to each of said multiplexers, each of said multiplexers is adapted to select a clock logic value and send said clock logic value to each of said voltage islands via said enable circuits, and said voltage islands is turned on or off depending on said clock logic value.

11. A system for generating random numbers according to claim 9, wherein each of said two or more clocks is adapted to send said clock logic value to each of said multiplexers, each of said multiplexers is adapted to select a particular clock logic value and send said particular clock logic value to each of said one or more latches at said voltage islands.

12. A system for generating random numbers according to claim 11, wherein each of said one or more latches is adapted to take a voltage value reading of their respective voltage island and send a corresponding output value to a register when said clock logic value is received by each of said one or more latches.

13. A system for generating random numbers according to claim 8, wherein said conversion circuit includes a first register for collecting latch output values and converting collected values to a binary number and a second register for combining said binary numbers.

14. A method of generating random numbers, comprising the steps of:
   providing a plurality of voltage islands, each of said plurality of voltage islands having one or more latches;
   randomly controlling the state of each of said plurality of voltage islands;
   capturing the voltage value of each of said plurality of voltage islands via said one or more latches;
   capturing an output value for each of said one or more latches; and
   converting said output value for each of said one or more latches to one or more binary numbers.

15. A method of generating random numbers according to claim 14, further comprising the steps of:
   providing two or more clocks, each of said clocks having a logic value;
   providing a multiplexer for each of said plurality of voltage islands, each of said multiplexers adapted to receive each of said logic values; and
   an enable circuit for each of said plurality of voltage islands.

16. A method of generating random numbers according to claim 15, further comprising the steps of:
   sending each of said logic values to each of said multiplexers;
   a particular logic value at each of said multiplexers;
   said particular logic value to each of said plurality of voltage islands via said enable circuits;
   on or turning off each of said plurality of voltage islands depending on said logic value sent by said multiplexer.

17. A method of generating random numbers according to claim 15, further comprising the steps of:
   sending said logic value to each of said multiplexers;
   a particular logic value at each of said multiplexers; and
   said particular logic value to each of said one or more latches at each of said plurality of voltage islands.

18. A method of generating random numbers according to claim 17, further comprising the steps of:
   capturing the voltage value of said voltage island at each of said one or more latches when said logic value is received by said one or more latches; and a corresponding output value is to a register.

19. A method of generating random numbers according to claim 14, further comprising the steps of:
   providing a conversion circuit including a first register and a second register;
   collecting latch output values in said first register;
   collected latch output values to a binary number; and
   storing said binary numbers in said second register.

20. A method of generating random numbers according to claim 19, further comprising the steps of:
   providing a third register; and
   storing said binary numbers in said third register for later use by the random number generator.

* * * * *